(12) United States Patent
Aweya et al.

(10) Patent No.: US 9,112,628 B2
(45) Date of Patent: Aug. 18, 2015

(54) METHOD AND DEVICES FOR COMPENSATING FOR PATH ASYMMETRY

(71) Applicants: Khalifa University of Science, Technology, and Research, Abu Dhabi (AE); British Telecommunications plc, London (GB); Emirates Telecommunications Corporation, Abu Dhabi (AE)

(72) Inventors: James Aweya, Abu Dhabi (AE); Zdenek Chaloupka, Abu Dhabi (AE)

(73) Assignees: Khalifa University of Science, Technology, and Research, Abu Dhabi (AE); British Telecommunications PLC, London (GB); Emirates Telecommunications Corporation, Abu Dhabi (AE)

( * ) Notice: Subject to any disclaimer, the term of this patent is extended or adjusted under 35 U.S.C. 154(b) by 87 days.

(21) Appl. No.: 14/044,083

(22) Filed: Oct. 2, 2013

(65) Prior Publication Data

US 2015/0092794 A1      Apr. 2, 2015

(51) Int. Cl.
*H04L 7/00*         (2006.01)
*H04J 3/06*         (2006.01)

(52) U.S. Cl.
CPC .................... *H04J 3/0667* (2013.01)

(58) Field of Classification Search
CPC ....... H04J 3/0635; H04J 3/065; H04J 3/0664; H04J 3/0667; H04J 3/0682; H04J 3/0685
USPC ............ 370/304, 324, 350, 395.62, 503, 507, 370/509, 510–514, 516–520
See application file for complete search history.

(56) References Cited

U.S. PATENT DOCUMENTS

| 6,661,810 B1* | 12/2003 | Skelly et al. | 370/516 |
| 2005/0041692 A1* | 2/2005 | Kallstenius | 370/503 |

(Continued)

FOREIGN PATENT DOCUMENTS

| EP | 1990938 | 11/2008 |
| EP | 1990938 A1 * | 11/2008 |

OTHER PUBLICATIONS

Ouellette et al., Using IEEE 1588 and Boundary Clocks for Clock Synchronization in Telecom Networks, IEEE 2011.*

(Continued)

*Primary Examiner* — Mang Yeung
(74) *Attorney, Agent, or Firm* — Calfee Halter & Griswold, LLP

(57) ABSTRACT

This invention relates to methods and devices for compensating for path asymmetry, particularly with reference to time and frequency synchronization. The invention has particular application where time and frequency synchronization over packet networks using, for example, the IEEE 1588 Precision Time Protocol (PTP) is being carried out. Typically communication path delays between a time server (master) and a client (slave) are estimated using the assumption that the forward delay on the path is the same as the reverse delay. As a result, differences between these delays (delay asymmetries) can cause errors in the estimation of the offset of the slave clock from that of the master. Embodiments of the invention provide techniques and devices for compensating for path delay asymmetries that arise when timing protocol messages experience dissimilar queuing delays in the forward and reverse paths.

18 Claims, 3 Drawing Sheets

(56) References Cited

U.S. PATENT DOCUMENTS

2007/0097947 A1* 5/2007 Aweya et al. .......... 370/350
2010/0034103 A1* 2/2010 Froehlich et al. ....... 370/252

OTHER PUBLICATIONS

Time and phase synchronization aspects of packet networks, Feb. 2012.*
M. Ouellette, Kuiwen Ji, Song Liu, and Han Li, "Using IEEE 1588 and boundary clocks for clock synchronization in telecom networks," IEEE Commun. Mag., Feb. 2011, pp. 164-171.
M. Ouellette, G. Garner, and S. Jobert "S. Simulations of a chain of Telecom Boundary Clocks combined with Synchronous Ethernet for phase/time transfer" 2011 International IEEE Symposium on Precision Clock Synchronization for Measurement Control and Communication (ISPCS), Sep. 12-16, 2011, pp. 105-113.
ITU-T Recommendation G.8271/Y.1366, Time and phase synchronization aspects of packet networks, Feb. 2012.
Murakami et al., "A Master Redundancy Technique in EIII 1588 Synchronization with a Link Congestion Estimation", 2010 International IEEE Symposium, Piscataway, NJ, Sep. 27, 2010, pp. 30-35.
International Search Report dated May 13, 2014, for International Application Serial No. PCT/GB2013/052574.
Written Opinion dated May 13, 2014, for International Application Serial No. PCT/GB2013/052574.

* cited by examiner

METHOD AND DEVICES FOR COMPENSATING FOR PATH ASYMMETRY

FIELD OF THE INVENTION

The present invention relates to methods and devices for estimating and compensating for path asymmetry. It is particularly, but not exclusively, concerned with estimating and compensating for path asymmetry where time and frequency synchronization over packet networks using, for example, the IEEE 1588 Precision Time Protocol (PTP) is being carried out.

BACKGROUND OF THE INVENTION

Timing transfer using a protocol such as IEEE 1588 PTP and a well designed slave clock recovery mechanism can provide time synchronization in the sub-microsecond region and lower. However, this is typically done using the important assumption that the time delay from master to slave is equal to that from slave to master.

In real life, the communication paths are not perfectly symmetric mainly due to dissimilar forward and reverse physical link delays and queuing delays. Even in cases where the physical link delays are known and properly compensated for during clock synchronization, queuing delays which are variable can still exist when timing messages go through the packet network and are queued for forwarding. The processing and buffering of packets in network devices (switches, routers, etc.) introduces variations in the time latency of packets traversing the packet network. This mainly happens when timing transfer is done in an end-to-end manner without any form of timing assistance from the network to help mitigate the effects of the variable queuing delays.

This "delay asymmetry" has become a major challenge in clock synchronization. The use of network timing support mechanisms such as boundary clocks (BCs) and transparent clocks (TCs) can eliminate delay asymmetry arising in the following scenarios [1][2][3]:

Dissimilar and variable queuing delays on forward and reverse paths (mainly due to different traffic load on the two traffic directions)

Asymmetry caused by timing packets taking different routes in each direction. This scenario is properly handled using peer-to-peer TCs. End-to-end TCs would not solve this kind of asymmetry.

Note that to achieve this, the BCs and TCs have to be implemented on a node-by-node (hop-by-hop) basis from the timing reference source to the slave clock.

However, even these timing support mechanisms are unable to correct for delay asymmetry due to dissimilar physical links between network elements. This asymmetry arises because the forward and reverse paths are implemented in fibers or copper pairs in the same cable with each fiber in a pair having a different length. These fibers or copper pairs may have different lengths and different electrical or optical characteristics which are significant enough to create delay differences. The impact on time accuracy can be on the order of 2.5 ns per meter, with a 100 meter length introducing a 250 ns error. If this difference is not properly compensated, even with the use of BCs, a static time error can accumulate over a chain of BCs. Over multiple fiber links, the accumulated time error can become significant enough to exceed the very tight tolerances required by some applications such as those in mobile networks.

The above mechanisms are also unable to correct for delay asymmetries arising from the timing distribution inside an individual node. These time errors are due to various internal asymmetric delays when a time reference is being distributed from a centralized module in a node (e.g., system card) to other modules in a node (e.g., line card). These time errors arise, for example, due to the length of backplane traces, connectors, and various logic functions. Today, the best way to solve physical link asymmetry and asymmetry internal to a node is to manually calibrate links and internal timing paths. There is growing interests in automatic mechanisms for fiber link asymmetry compensation but these are under study.

IEEE 1588 PTP Message Flow

The IEEE 1588v2 PTP defines a packet-based synchronization protocol for communicating frequency, phase and time-of-day information from a master to one or more slaves with sub-microsecond accuracy. PTP relies on the use of accurately timestamped packets (at nanosecond level granularity) sent from a master clock to one or more slave clocks to allow them to synchronize (in frequency or time or both) to the master clock. Synchronization information is distributed hierarchically, with a GrandMaster clock at the root of the hierarchy. The GrandMaster provides the time reference for one or more slave devices. These slave devices can, in turn, act as master devices for further hierarchical layers of slave devices.

The PTP message exchange process (i.e., the PTP Delay Request/Delay Response flow) between a master and a slave is illustrated in FIG. 1 and described below.

IEEE 1588 PTP allows for two different types of timestamping methods, either one-step or two-step. One-step clocks update time information within event messages (Sync and Delay_Req) on-the-fly, while two-step clocks convey the precise timestamps of packets in general messages (Follow_Up and Delay_Resp). A Sync message is transmitted by a master 1 to its slaves 3 and either contains the exact time of its transmission or is followed by a Follow_Up message containing this time. In a two-step ordinary or boundary clock, the Follow_Up message communicates the value of the departure timestamp for a particular Sync message.

FIG. 1 illustrates the basic pattern of synchronization message exchanges for the two-step clocks. The master 1 sends a Sync message to the slave 3 over the packet network 2 and notes the time $T_1$ at which it was sent. The slave receives the Sync message and notes the time of reception $T_2$. The master 1 conveys to the slave 3 the timestamp $T_1$ by one of two ways: 1) Embedding the timestamp $T_1$ in the Sync message. This requires some sort of hardware processing (i.e., hardware timestamping) for highest accuracy and precision. 2) Embedding the timestamp $T_1$ a Follow_Up message which is the sent to the slave (as shown in FIG. 1). Next, the slave 3 sends a Delay_Req message to the master 1 and notes the time $T_3$ at which it was sent. The master receives the Delay_Req message and notes the time of reception $T_4$. The master 1 conveys to the slave 3 the timestamp $T_4$ by embedding it in a Delay_Resp message.

At the end of this PTP message exchange, the slave 3 possesses all four timestamps $\{T_2, T_3, T_4\}$. These timestamps may be used to compute the offset of the slave's clock 5 with respect to the master clock 4 and the mean propagation time of messages between the two clocks. The computation of offset and propagation time assumes that the master-to-slave and slave-to-master propagation times are equal, i.e. that there is a symmetrical communication path. Clock frequencies change over time, so periodic message exchanges are required. Because these clock variations change slowly, the period between message exchanges is typically on the order of milliseconds to seconds.

An aim of the present invention is to provide mechanisms for compensating for asymmetries that are created by unequal queuing delays in the forward and reverse directions on a communicating path without using networking timing support mechanisms like BCs and TCs. Compensating for queue-induced asymmetries can eliminate a major source of clock errors particularly when timing messages traverse queuing systems in the packet network.

End-to-end time transfer is the most challenging problem in clock synchronization but also offers attractive benefits to the network operator. A further aim of the present invention is to provide methods and devices which offer transparency to the network where timing messages can cross different types of networks (Ethernet, MPLS, Packet of SONET, Frame Relay, etc.).

SUMMARY OF THE INVENTION

An exemplary embodiment of the invention provides a method of estimating asymmetric delays in communications between a master device and a slave device connected by a network, the method including the steps of: sending to the slave device first and second timing messages from the master device and respective first and second timestamps being the time of sending of the first and second messages according to the master clock; recording as third and fourth timestamps the time of receipt of the first and second messages at the slave device according to the slave clock; sending third and fourth timing messages to the master device from the slave device and recording as fifth and sixth timestamps the time of sending of the third and fourth messages according to the slave clock; recording as seventh and eighth timestamps the time of receipt of the third and fourth messages at the master device according to the master clock; sending, from the master device to the slave device, the seventh and eighth timestamps; calculating from said first to fourth timestamps a forward displacement factor which is the difference between the interval between the sending of said first and second timing messages and the interval between the receipt of said first and second timing messages; maintaining a total sum of said forward displacement factors since a predetermined point in time; estimating the total forward delay experienced by the timing messages sent from the master device to the slave device as equal to said total sum; estimating a minimum forward delay experienced by timing messages sent from the master device to the slave device; estimating the forward queuing delay as the difference between the estimated total forward delay and the estimated minimum forward delay; calculating from said fifth to eighth timestamps a reverse displacement factor which is the difference between the interval between the sending of said third and fourth timing messages and the interval between the receipt of said third and fourth timing messages; maintaining a total sum of said reverse displacement factors since a predetermined point in time; estimating the total reverse delay experienced by the timing messages sent from the master device to the slave device as equal to said total sum; estimating a minimum reverse delay experienced by timing messages sent from the salve device to the master device; and estimating the reverse queuing delay as the difference between the estimated total forward delay and the estimated minimum reverse delay.

A further exemplary embodiment of the present invention provides a slave device connected to a master device having a master clock over a network, wherein the slave device includes: a slave clock; and a processor, wherein: the slave device is arranged to: receive first and second timing messages sent from the master device and respective first and second timestamps being the time of sending of the first and second messages according to the master clock, and to record the time of receipt of the first and second messages according to the slave clock as third and fourth timestamps; send third and fourth timing messages to the master device for the master device to record the time of receipt of the third and fourth messages according to the master clock; record the time of sending of the third and fourth messages according to the slave clock as fifth and sixth timestamps; and receive, from the master device, the recorded time of receipt of the third and fourth messages as seventh and eighth timestamps; and the processor is arranged to: calculate from said first to fourth timestamps a forward displacement factor which is the difference between the interval between the sending of said first and second timing messages and the interval between the receipt of said first and second timing messages; maintain a total sum of said forward displacement factors since a predetermined point in time; estimate the total forward delay experienced by the timing messages sent from the master device to the slave device as equal to said total sum; estimate a minimum forward delay experienced by timing messages sent from the master device to the slave device; estimate the forward queuing delay as the difference between the estimated total forward delay and the estimated minimum forward delay; calculate from said fifth to eighth timestamps a reverse displacement factor which is the difference between the interval between the sending of said third and fourth timing messages and the interval between the receipt of said third and fourth timing messages; maintain a total sum of said reverse displacement factors since a predetermined point in time; estimate the total reverse delay experienced by the timing messages sent from the master device to the slave device as equal to said total sum; estimate a minimum reverse delay experienced by timing messages sent from the salve device to the master device; and estimate the reverse queuing delay as the difference between the estimated total forward delay and the estimated minimum reverse delay.

A further exemplary embodiment of the present invention provides a system for estimating asymmetric delays in communications between a master device and a slave device connected by a network, the system including: the master device having the master clock; the slave device having the slave clock and a processor; and a network connecting the master device and the slave device, wherein: the master device is arranged to send first and second timing messages to the slave device and respective first and second timestamps being the time of sending of the first and second messages according to the master clock, the slave device is arranged to record the time of receipt of the first and second messages according to the slave clock as third and fourth timestamps; the slave device is arranged to send third and fourth timing messages to the master device and to record the time of sending of the third and fourth messages according to the slave clock as fifth and sixth timestamps; and the master device is arranged to record the time of receipt of the third and fourth messages according to the master clock as seventh and eighth timestamps and to send those timestamps to the slave device; and further wherein: the processor in the slave device is arranged to: calculate from said first to fourth timestamps a forward displacement factor which is the difference between the interval between the sending of said first and second timing messages and the interval between the receipt of said first and second timing messages; maintain a total sum of said forward displacement factors since a predetermined point in time; estimate the total forward delay experienced by the timing messages sent from the master device to the slave device as equal to said total sum; estimate a minimum forward delay experienced by timing messages sent from the master device to the slave device; estimate the forward queuing delay as the difference between the estimated total forward delay and the estimated minimum forward delay; calculate from said fifth to eighth timestamps a reverse displacement factor which is the difference between the interval between the sending of said third and fourth timing messages and the interval between the receipt of said third and fourth timing messages; maintain a total sum of said reverse displacement factors since a predetermined point in time; estimate the total reverse delay experienced by the timing messages sent from the master device to the slave device as equal to said total sum; estimate a minimum reverse delay experienced by timing messages sent from the salve device to the master device; and estimate the reverse queuing delay as the difference between the estimated total forward delay and the estimated minimum reverse delay.

BRIEF DESCRIPTION OF THE DRAWINGS

Embodiments of the invention will now be described by way of example with reference to the accompanying drawings in which.

DETAILED DESCRIPTION

Figure 1:
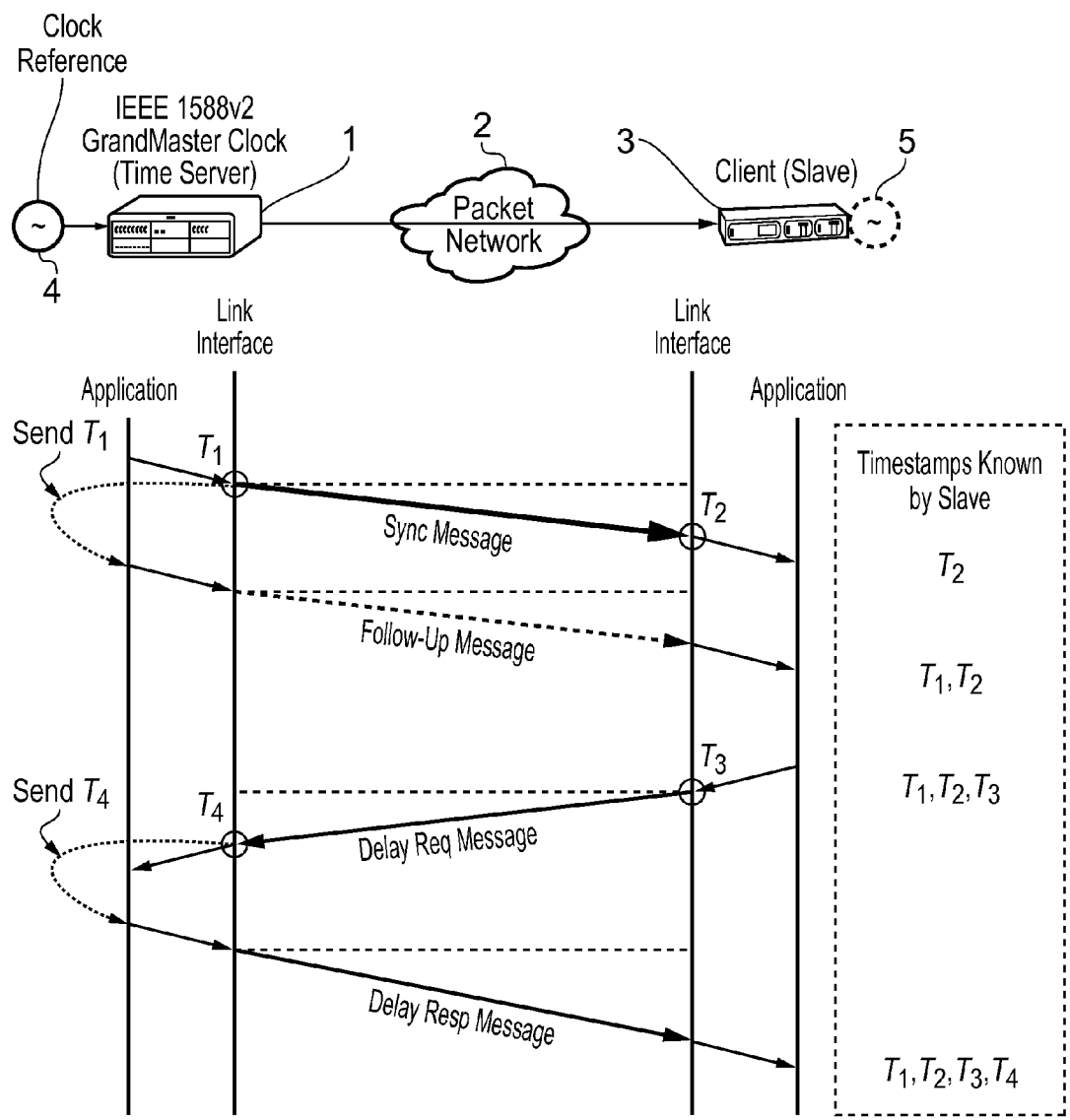
FIG. 1 shows the sequence of messages in a two-step clock synchronisation method under IEEE 1588 PTP and has already been described.

Accordingly, at their broadest, methods of the present invention provide for estimating the asymmetric delays in communications between a master device and a slave device based on the intervals between the sending of timing messages and the receipt of the timing messages by the respective devices.

A first aspect of the present invention provides a method of estimating asymmetric delays in communications between a master device and a slave device connected by a network, the method including the steps of: sending to the slave device first and second timing messages from the master device and respective first and second timestamps being the time of sending of the first and second messages according to the master clock; recording as third and fourth timestamps the time of receipt of the first and second messages at the slave device according to the slave clock; sending third and fourth timing messages to the master device from the slave device and recording as fifth and sixth timestamps the time of sending of the third and fourth messages according to the slave clock; recording as seventh and eighth timestamps the time of receipt of the third and fourth messages at the master device according to the master clock; sending, from the master device to the slave device, the seventh and eighth timestamps; calculating from said first to fourth timestamps a forward displacement factor which is the difference between the interval between the sending of said first and second timing messages and the interval between the receipt of said first and second timing messages; maintaining a total sum of said forward displacement factors since a predetermined point in time; estimating the total forward delay experienced by the timing messages sent from the master device to the slave device as equal to said total sum; estimating a minimum forward delay experienced by timing messages sent from the master device to the slave device; estimating the forward queuing delay as the difference between the estimated total forward delay and the estimated minimum forward delay; calculating from said fifth to eighth timestamps a reverse displacement factor which is the difference between the interval between the sending of said third and fourth timing messages and the interval between the receipt of said third and fourth timing messages; maintaining a total sum of said reverse displacement factors since a predetermined point in time; estimating the total reverse delay experienced by the timing messages sent from the master device to the slave device as equal to said total sum; estimating a minimum reverse delay experienced by timing messages sent from the salve device to the master device; and estimating the reverse queuing delay as the difference between the estimated total forward delay and the estimated minimum reverse delay.

Preferably the timing messages are messages according to the IEEE 1588 PTP. For example, the first and second messages may be Sync messages and the third and fourth messages may be Delay_Req messages.

The methods of the invention may use one- or two-step clock mechanisms to transfer the timestamps between master and slave. In the one-step clock mechanism, the first and second timestamps may be sent as timestamps embedded in the first and second messages themselves. In the two-step clock mechanism, the first and second timestamps are recorded by the master device and sent to the slave device in separate timing messages.

The methods of this aspect are preferably employed when timing signals and synchronization is desired to be transferred in an end-to-end manner from a master clock to a slave clock over a packet network without timing support from the network. Queue-induced asymmetry is a major contributor to the time error between master and slave clocks.

The steps of the method may be repeated, preferably continuously whilst the slave clock is desired to be synchronized to the master clock.

By estimating the queuing delays in each direction separately, methods of the present aspect can allow for compensation for queue-induced asymmetries, which can eliminate a major source of clock errors particularly when timing messages traverse queuing systems in the packet network.

The methods of the present aspect can also be used to allow transparency to the network where timing messages can cross different types of networks (Ethernet, MPLS, Packet of SONET, Frame Relay, etc.).

Only end nodes participate in time transfer and thus the method is transparent to the intermediate transport network. There is no need for special control or processing mechanisms in the intermediate packet network and legacy asynchronous Ethernet devices do not need to be upgraded or retrofitted. Furthermore, no hardware modification is necessary in the network equipment.

Preferably the steps of calculating the forward and reverse displacement factors take account of the estimated skew of the slave clock compared to the master clock. Any skew of the slave clock compared to the master clock may introduce errors into the estimates and so is preferably accounted for. The skew may be known from synchronization of the slave clock at an earlier time.

In certain embodiments of the present aspect, the steps of estimating the minimum delays involve determining the smallest total delay experienced by a timing message in the respective direction since the start of the exchange of timing messages. The respective delay on each message is readily calculated from the timestamps used in the method of this aspect. In this embodiment it is assumed that the delays attributable to the physical link can be determined as the delays experienced by the message having the smallest total delay in transit (i.e. experiencing no queuing delays). Whilst this estimate may be imprecise for the first few iterations of the method, it will eventually settle down and provide an accurate estimate of the delays attributable to the physical link.

In further embodiments of the present aspect, the steps of estimating the minimum delays involve determining the smallest delay experienced by a timing message in the respective direction within a predetermined period prior to the exchange of timing messages. As in the embodiments described previously, the delays attributable to the physical link can be determined as the minimum delay experienced by a timing message. However, in certain cases, the nature of the physical link between a slave device and the master device can change over time, and so it may be desirable to "refresh" the set of samples from which the physical link delay is estimated on a periodic basis, and therefore limit the samples from which the minimum delay is estimated to a certain time period prior to the exchange of timing messages in question.

Preferably the methods of this aspect form part of a larger method which includes the steps of estimating the skew and offset of the slave clock compared to the master clock using the calculated delays. More preferably the method further includes the step of synchronizing the slave clock to the master clock using said estimated skew and offset.

Timing protocols such as IEEE 1588 Precision Time Protocol (PTP) and Network Time Protocol (NTP) require an accurate measurement of the communication path delay between the time server (master) and the client (slave). The one-way delay is then normally estimated using the assumption that the forward delay on the path is the same as the reverse delay. Any difference between the forward and reverse delay, known as delay asymmetry, creates an error in the estimate of the slave clock's offset from the master. Therefore the methods of this aspect may reduce or eliminate such errors.

For the purpose of estimating the skew and offset of the slave clock, it may be assumed that the physical link between master and slave is symmetric. Alternatively, any physical link asymmetries may be separately calibrated and compensated for during clock synchronization.

The method of the present aspect may include any combination of some, all or none of the above described preferred and optional features.

The methods of the above aspect is preferably implemented using a slave device according to the second aspect of this invention, or a system according to the third aspect of this invention, as described below, but need not be.

Further aspects of the present invention include computer for running on computer systems which carry out the methods of the above aspects, including some, all or none of the preferred and optional features of those aspects.

At their broadest, the slave devices according to the present invention are arranged to exchange timing messages with a master device and to estimate the asymmetric delays in communications between a master device and a slave device based on the intervals between the sending of timing messages and the receipt of the timing messages by the respective devices.

A second aspect of the present invention provides a slave device connected to a master device having a master clock over a network, wherein the slave device includes: a slave clock; and a processor, wherein: the slave device is arranged to: receive first and second timing messages sent from the master device and respective first and second timestamps being the time of sending of the first and second messages according to the master clock, and to record the time of receipt of the first and second messages according to the slave clock as third and fourth timestamps; send third and fourth timing messages to the master device for the master device to record the time of receipt of the third and fourth messages according to the master clock; record the time of sending of the third and fourth messages according to the slave clock as fifth and sixth timestamps; and receive, from the master device, the recorded time of receipt of the third and fourth messages as seventh and eighth timestamps; and the processor is arranged to: calculate from said first to fourth timestamps a forward displacement factor which is the difference between the interval between the sending of said first and second timing messages and the interval between the receipt of said first and second timing messages; maintain a total sum of said forward displacement factors since a predetermined point in time; estimate the total forward delay experienced by the timing messages sent from the master device to the slave device as equal to said total sum; estimate a minimum forward delay experienced by timing messages sent from the master device to the slave device; estimate the forward queuing delay as the difference between the estimated total forward delay and the estimated minimum forward delay; calculate from said fifth to eighth timestamps a reverse displacement factor which is the difference between the interval between the sending of said third and fourth timing messages and the interval between the receipt of said third and fourth timing messages; maintain a total sum of said reverse displacement factors since a predetermined point in time; estimate the total reverse delay experienced by the timing messages sent from the master device to the slave device as equal to said total sum; estimate a minimum reverse delay experienced by timing messages sent from the salve device to the master device; and estimate the reverse queuing delay as the difference between the estimated total forward delay and the estimated minimum reverse delay.

Preferably the timing messages are messages according to the IEEE 1588 PTP. For example, the first and second messages may be Sync messages and the third and fourth messages may be Delay_Req messages.

The slave devices of this aspect may use one- or two-step clock mechanisms to transfer the timestamps between master and slave. In the one-step clock mechanism, the first and second timestamps may be received as timestamps embedded in the first and second messages themselves. In the two-step clock mechanism, the first and second timestamps are recorded by the master device and are received by the slave device in separate timing messages.

The slave devices of this aspect are preferably employed when timing signals and synchronization is desired to be transferred in an end-to-end manner from a master clock to a slave clock over a packet network without timing support from the network. Queue-induced asymmetry is a major contributor to the time error between master and slave clocks.

The processor of the slave devices of this aspect preferably operates continuously as described during the period in which the slave clock is desired to be synchronized to the master clock.

By estimating the queuing delays in each direction separately, the slave device of the present aspect can allow for compensation for queue-induced asymmetries, which can eliminate a major source of clock errors particularly when timing messages traverse queuing systems in the packet network.

The slave devices of the present aspect can also allow transparency to the network where timing messages can cross different types of networks (Ethernet, MPLS, Packet of SONET, Frame Relay, etc.).

Only end nodes participate in time transfer, thus, the operation of the slave device to estimate the queuing delays is transparent to the intermediate transport network. There is no need for special control or processing mechanisms in the intermediate packet network and legacy asynchronous Ethernet devices do not need to be upgraded or retrofitted. Furthermore, no hardware modification is necessary in the network equipment.

Preferably when calculating the forward and reverse displacement factors, the processor takes account of the estimated skew of the slave clock compared to the master clock. Any skew of the slave clock compared to the master clock may introduce errors into the estimates and so is preferably accounted for. The skew may be known from synchronization of the slave clock at an earlier time.

In certain embodiments of the present aspect, the estimation of the minimum delays may involve determining the smallest total delay experienced by a timing message in the respective direction since the start of the exchange of timing messages. The respective delay on each message is readily calculated from the timestamps used in the method of this aspect. In this embodiment it is assumed that the delays attributable to the physical link can be determined as the delays experienced by the message having the smallest total delay in transit (i.e. experiencing no queuing delays). Whilst this estimate may be imprecise for the first few iterations of the method, it will eventually settle down and provide an accurate estimate of the delays attributable to the physical link.

In further embodiments of the present aspect, the estimation of the minimum delays may involve determining the smallest delay experienced by a timing message in the respective direction within a predetermined period prior to the exchange of timing messages. As in the embodiments described previously, the delays attributable to the physical link can be determined as the minimum delay experienced by a timing message. However, in certain cases, the nature of the physical link between a slave device and the master device can change over time, and so it may be desirable to "refresh" the set of samples from which the physical link delay is estimated on a periodic basis, and therefore limit the samples from which the minimum delay is estimated to a certain time period prior to the exchange of timing messages in question.

Preferably the slave devices of this aspect are also arranged to estimate the skew and offset of the slave clock compared to the master clock using the calculated delays. More preferably the slave devices are also arranged to synchronize the slave clock to the master clock using said estimated skew and offset.

The slave device of this aspect preferably operates by carrying out a method according to the above described first aspect.

The slave device of the present aspect may include any combination of some, all or none of the above described preferred and optional features.

At their broadest, systems of the present invention provide for estimating the asymmetric delays in communications between a master device and a slave device based on the intervals between the sending of timing messages and the receipt of the timing messages by the respective devices.

A third aspect of the present invention provides a system for estimating asymmetric delays in communications between a master device and a slave device connected by a network, the system including: the master device having the master clock; the slave device having the slave clock and a processor; and a network connecting the master device and the slave device, wherein: the master device is arranged to send first and second timing messages to the slave device and respective first and second timestamps being the time of sending of the first and second messages according to the master clock, the slave device is arranged to record the time of receipt of the first and second messages according to the slave clock as third and fourth timestamps; the slave device is arranged to send third and fourth timing messages to the master device and to record the time of sending of the third and fourth messages according to the slave clock as fifth and sixth timestamps; and the master device is arranged to record the time of receipt of the third and fourth messages according to the master clock as seventh and eighth timestamps and to send those timestamps to the slave device; and further wherein: the processor in the slave device is arranged to: calculate from said first to fourth timestamps a forward displacement factor which is the difference between the interval between the sending of said first and second timing messages and the interval between the receipt of said first and second timing messages; maintain a total sum of said forward displacement factors since a predetermined point in time; estimate the total forward delay experienced by the timing messages sent from the master device to the slave device as equal to said total sum; estimate a minimum forward delay experienced by timing messages sent from the master device to the slave device; estimate the forward queuing delay as the difference between the estimated total forward delay and the estimated minimum forward delay; calculate from said fifth to eighth timestamps a reverse displacement factor which is the difference between the interval between the sending of said third and fourth timing messages and the interval between the receipt of said third and fourth timing messages; maintain a total sum of said reverse displacement factors since a predetermined point in time; estimate the total reverse delay experienced by the timing messages sent from the master device to the slave device as equal to said total sum; estimate a minimum reverse delay experienced by timing messages sent from the salve device to the master device; and estimate the reverse queuing delay as the difference between the estimated total forward delay and the estimated minimum reverse delay.

Preferably the timing messages are messages according to the IEEE 1588 PTP. For example, the first and second messages may be Sync messages and the third and fourth messages may be Delay_Req messages.

The systems of this aspect may use one- or two-step clock mechanisms to transfer the timestamps between master and slave. In the one-step clock mechanism, the first and second timestamps may be recorded by the master device and embedded as timestamps in the first and second messages themselves. In the two-step clock mechanism, the first and second timestamps are recorded by the master device and sent in separate timing messages.

The systems of this aspect are preferably employed when timing signals and synchronization is desired to be transferred in an end-to-end manner from a master clock to a slave clock over a packet network without timing support from the network. Queue-induced asymmetry is a major contributor to the time error between master and slave clocks.

The processor of the slave devices in the systems of this aspect preferably operates continuously as described during the period in which the slave clock is desired to be synchronized to the master clock.

By estimating the queuing delays in each direction separately, the system of the present aspect can allow for compensation for queue-induced asymmetries, which can eliminate a major source of clock errors particularly when timing messages traverse queuing systems in the packet network.

The system of the present aspect can also provide transparency to the network where timing messages can cross different types of networks (Ethernet, MPLS, Packet of SONET, Frame Relay, etc.).

Only end nodes participate in time transfer, thus, the operation of the slave device to estimate the queuing delays is transparent to the intermediate transport network. There is no need for special control or processing mechanisms in the intermediate packet network and legacy asynchronous Ethernet devices do not need to be upgraded or retrofitted. Furthermore, no hardware modification is necessary in the network equipment.

Preferably when calculating the forward and reverse displacement factors, the processor takes account of the estimated skew of the slave clock compared to the master clock. Any skew of the slave clock compared to the master clock may introduce errors into the estimates and so is preferably accounted for. The skew may be known from synchronization of the slave clock at an earlier time.

In certain embodiments of the present aspect, the estimation of the minimum delays may involve determining the smallest total delay experienced by a timing message in the respective direction since the start of the exchange of timing messages. The respective delay on each message is readily calculated from the timestamps used in the method of this aspect. In this embodiment it is assumed that the delays attributable to the physical link can be determined as the delays experienced by the message having the smallest total delay in transit (i.e. experiencing no queuing delays). Whilst this estimate may be imprecise for the first few iterations of the method, it will eventually settle down and provide an accurate estimate of the delays attributable to the physical link.

In further embodiments of the present aspect, the estimation of the minimum delays may involve determining the smallest delay experienced by a timing message in the respective direction within a predetermined period prior to the exchange of timing messages. As in the embodiments described previously, the delays attributable to the physical link can be determined as the minimum delay experienced by a timing message. However, in certain cases, the nature of the physical link between a slave device and the master device can change over time, and so it may be desirable to "refresh" the set of samples from which the physical link delay is estimated on a periodic basis, and therefore limit the samples from which the minimum delay is estimated to a certain time period prior to the exchange of timing messages in question.

Preferably the slave devices in the systems of this aspect are also arranged to estimate the skew and offset of the slave clock compared to the master clock using the calculated delays. More preferably the slave devices are also arranged to synchronize the slave clock to the master clock using said estimated skew and offset.

The systems of this aspect preferably operate by carrying out a method according to the above described first aspect.

The systems of the present aspect may include any combination of some, all or none of the above described preferred and optional features.

Basic Clock Model

Figure 2:
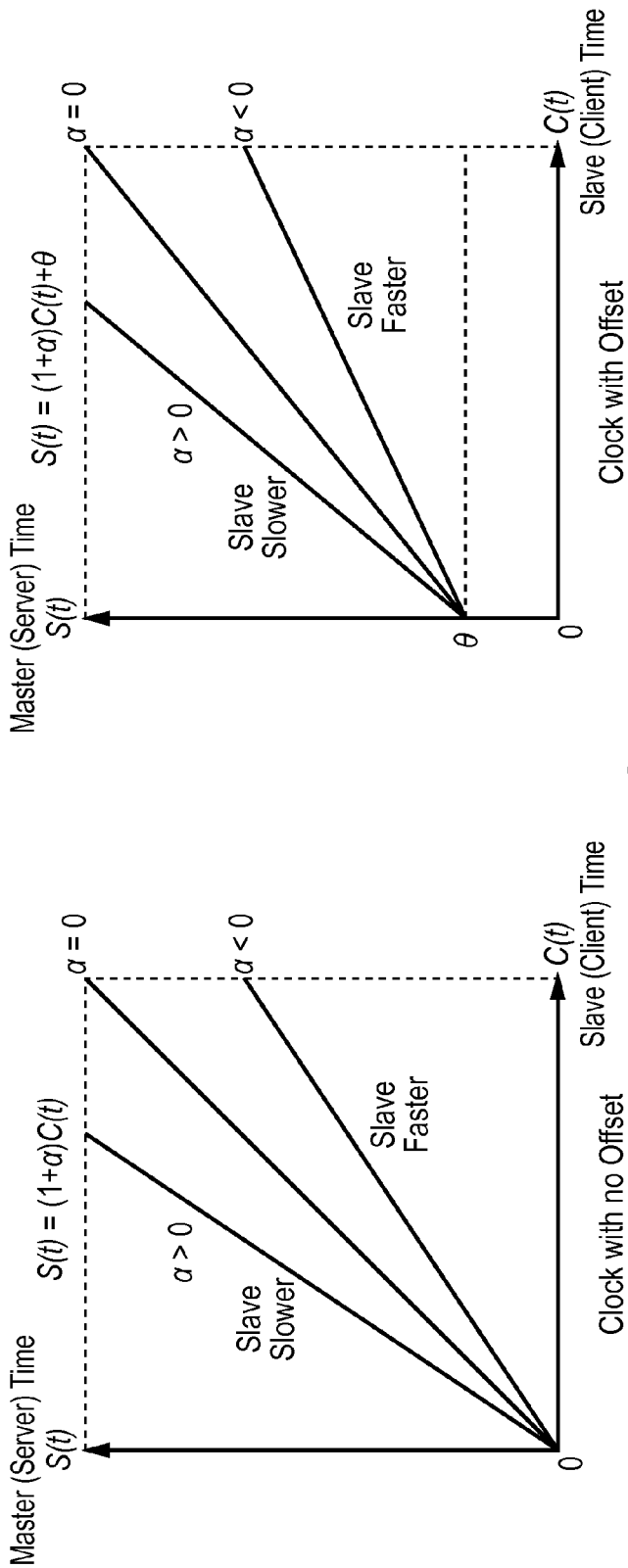
FIG. 2 shows the relationship between master and slave clocks in situations with and without offset.

In order to consider the synchronization problem, we can define a generalized clock offset and skew equation for this problem. It is assumed that, at any particular time instant, the instantaneous view of the relationship between the master (server) clock 4 with timeline S(t) and the slave (client) clock 5 with timeline C(t), can be described by the well-know simple skew clock model depicted in FIG. 2, and described by the equation, $$S(t)=(1+\alpha)C(t)+\theta, \quad (1)$$

where the skew $\alpha$ is a very small quantity in the order of parts-per-million. This snapshot is an instantaneous view of how well the two clocks are (mis)aligned. FIG. 2 illustrates the influence of $\theta$ and $\alpha$ on the alignment.

Figure 3:
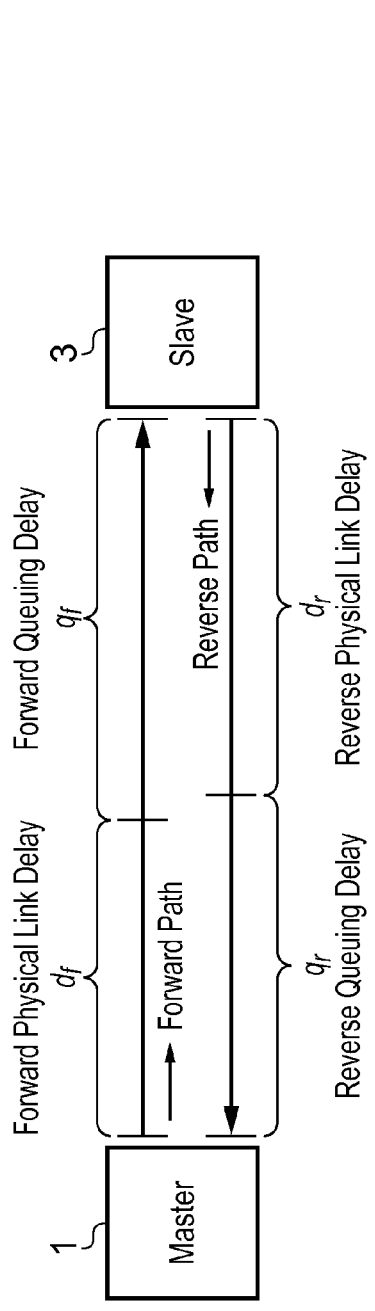
FIG. 3 illustrates the path delays that may exist on communications between a master and slave.

The above equation can be extended to account for the case where the master clock 4 and slave clock 5 exchange messages over a communication link with delay. First, assume that the nth Sync message travels from a master to a slave experiences a fixed physical link (or propagation) delay of $d_f$ plus variable cumulative queuing (or stochastic) delay of $q_{f,n}$ (see FIG. 3). Similarly, assume that the nth Delay_Req message sent from the slave 3 to the master 1 experiences a fixed delay of $d_r$ plus variable cumulative queuing delay of $d_{r,n}$. An asymmetric path exists when the fixed delay components and/or queuing delay components in both directions are unequal. We assume that the physical link asymmetry is manually calibrated and compensated for but the queue-induced asymmetry can be compensated for using a technique as described in the embodiments below.

The master 1 and slave 3 exchange messages using the delay-request delay-response mechanism described in FIG. 1. For the nth Sync message which departs the master 1 with timestamp $T_{1,n} \in S(t)$ and arrives at the slave with timestamp $T_{2,n} \in C(t)$ after having experienced delays of $d_f$ and $q_{f,n}$, the simple skew clock model above can be extended to account for the travel time to obtain the following expression $$(T_{1,n}+d_f+q_{f,n})=(1+\alpha)T_{2,n}+\theta, \quad (2)$$

For the nth Delay_Req message which departs the slave with timestamp $T_{3,n} \in C(t)$ and arrives at the master with timestamp $T_{4,n} \in S(t)$ after having experienced delays of $d_r$ and $q_{r,n}$, we obtain the following expression $$(T_{4,n}-d_r-q_{r,n})=(1+\alpha)T_{3,n}+\theta, \quad (3)$$

A key assumption here is that the message exchanges occur over a period of time so small that the offset $\theta$ can be assumed constant over that period. A technique for computing the queue induced offset $\theta_q$ using Sync and Delay_Req message exchanges is described below.

Compensating for Queue-Induced Path Asymmetry

Adding equations (2) and (3) and rearranging provides a formula for the overall clock offset $\theta$ as $$\theta = \frac{(T_{1,n}+T_{4,n})-(1+\alpha)(T_{2,n}+T_{3,n})+(d_f-d_r)+(q_{f,n}-q_{r,n})}{2}$$

$$= \frac{(T_{1,n}+T_{4,n})-(1+\alpha)(T_{2,n}+T_{3,n})}{2} + \frac{(d_f-d_r)}{2} + \frac{(q_{f,n}-q_{r,n})}{2}$$

$$= \theta_{raw}+\theta_{prop}+\theta_{queue} \quad (4)$$

where, $\theta_{raw}=[(T_{1,n}+T_{4,n})-(1+\alpha)(T_{2,n}+T_{3,n})]/2$ is the raw offset or true offset in the absence of any asymmetries in the system, $\theta_{prop}=(d_f-d_r)/2$ is the offset compensation due to asymmetry in the physical link (or propagation) delay, and $\theta_{queue}=(g_{f,n}-q_{r,n})/2$ is the offset compensation due to asymmetry in the queuing delay.

The raw offset $\theta_{raw}$ is the simplest quantity often computed during clock synchronization because the system is assumed to be symmetric in the average sense (the average delay in both directions on the path are assumed to be equal). The offset $\theta_{prop}$ can be determined as described in ITU-T Rec G.8271 [3] and added to the raw offset $\theta_{raw}$. The embodiment of the present invention below sets out a new technique for computing the offset $\theta_{queue}$ which is a quantity often ignored during clock synchronization.

The offset $\theta_{queue}$ is often ignored by assuming that the average delays in both directions on the path are equal. However, using the embodiments below, no such assumption is required since it is now possible to compute $\theta_{queue}$ accurately.

The offset $\theta_{queue}$ can be computed by examining the departure and arrival patterns of PTP messages (Sync and Delay_Req messages). The processing and buffering of packets in network devices (switches, routers, etc.) introduce variations in the delay of packets traversing the packet network. The packet delay variation (PDV) inherent in packet networks is a primary source of clock noise. The nature of the variability of the delay can lead to an additional asymmetry that can produce the offset $\theta_{queue}$. To illustrate this, the departure of Sync messages from a master and their arrival at a slave as shown in FIG. 4 are analysed.

Figure 4:
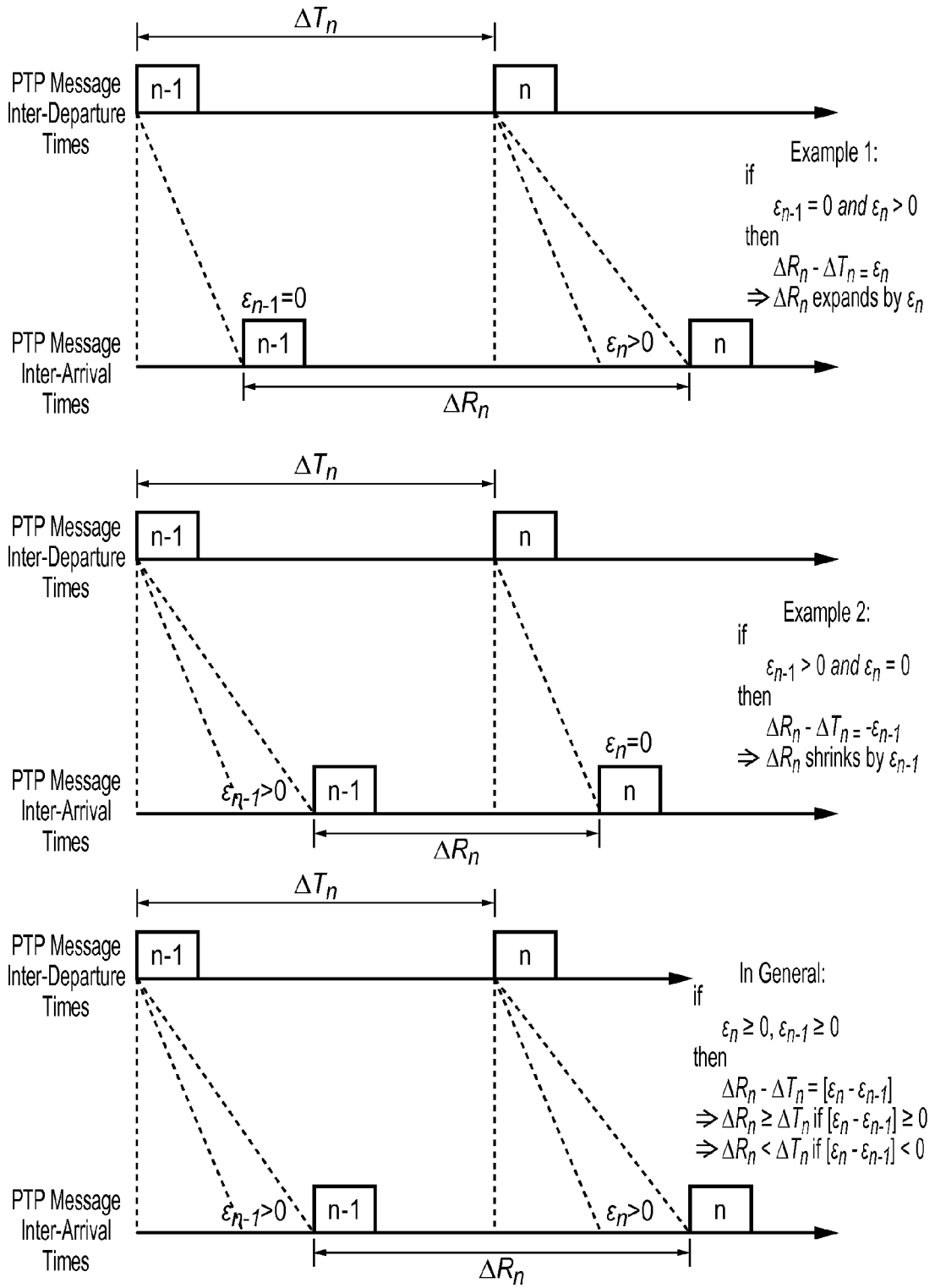
FIG. 4 shows, in schematic form, the effect of packet delay variation on message inter-arrival times.

$\epsilon$ is defined as the additional delay beyond the fixed propagation $d_f$ that a Sync message experiences due to queuing in the network. $\gamma$ is defined as the additional delay beyond the fixed propagation $d_r$ that a Delay_Req message experiences due to queuing in the network. The following terms are also defined:

$\Delta T_{f,n} = T_{1,n} - T_{1,n-1}$ is the inter-departure time of the nth Sync message at the master $\Delta R_{f,n} = T_{2,n} - T_{2,n-1}$ is the inter-arrival time of the nth Sync message at the slave $\Delta T_{r,n} = T_{3,n} - T_{3,n-1}$ is the inter-departure time of the nth Delay_Req message at the slave $\Delta R_{r,n} = T_{4,n} - T_{4,n-1}$ is the inter-arrival time of the nth Delay_Req message at the master As shown in FIG. 4 messages depart with well-defined spacing but arrive with shrunken, expanded or same spacing depending on the queuing delay $\epsilon$ (or $\gamma$) experienced by the messages. For example, for Sync messages, the difference $\epsilon_n - \epsilon_{n-1}$ defines a displacement factor that dictates how much the $\Delta R_{f,n}$ expands or shrinks over $\Delta T_{f,n}$. A similar observation applies to the Delay_Req message transfers. It can be seen from FIG. 4 that $\Delta R_{f,n}$ expands or shrinks from $\Delta T_{f,n}$ depending on the sign of $\epsilon_n - \epsilon_{n-1}$. $\Delta R_{f,n}$ shrinks if the displacement factor $\epsilon_n - \epsilon_{n-1} < 0$ and expands if displacement factor $\epsilon_n \epsilon_{n-1} > 0$. The ideal or desirable behavior is when the displacement factor is $\epsilon_n - \epsilon_{n-1} = 0$ (i.e., $\Delta R_{f,n} - \Delta T_{f,n} = 0$).

The deviation (displacement) of $\Delta R_{f,n}$ from the ideal $\Delta T_{f,n}$ over time cumulatively contributes to the deviation (i.e., time deviation or offset) in the recovered clock at the slave. The ideal $\Delta T_{f,n}$ is set by the master and the cumulative deviation of $\Delta R_{f,n}$ from the ideal at any point in time translates into an error or noise term in the recovered clock and this noise or error term is queue-induced. Note that for Sync message transfers, $\Delta R_{f,n} - \Delta T_{f,n}$ is a measure of the displacement factor $\epsilon_n - \epsilon_{n-1} = D_{\epsilon,n}$.

$$\Delta R_{f,n} - \Delta T_{f,n} = \epsilon_n - \epsilon_{n-1} = D_{\epsilon,n} \quad (5)$$

If $d_{ftotal,n} = T_{2,n} - T_{1,n}$ is defined as the total forward delay from master to slave at time n, the above expression can be written as $$D_{\epsilon,n} = \epsilon_n - \epsilon_{n-1} \quad (6)$$
$$= \Delta R_{f,n} - \Delta T_{f,n}$$
$$= [T_{2,n} - T_{2,n-1}] - [T_{1,n} - T_{1,n-1}]$$
$$= [T_{2,n} - T_{1,n}] - [T_{2,n-1} - T_{1,n-1}]$$
$$= d_{ftotal,n} - d_{ftotal,n-1}$$

For Delay_Req messages, $\Delta R_{r,n} - \Delta T_{r,n}$ is a measure of the corresponding displacement factor $\gamma_n - \gamma_{n-1} = D_{\gamma,n}$.

$$\Delta R_{r,n} - \Delta T_{r,n} = \gamma_n - \gamma_{n-1} = D_{\gamma,n} \quad (7)$$

Similar to above, if $d_{rtotal,n} = T_{4,n} - T_{3,n}$ is defined as the total reverse delay from slave to master at time n, the above expression can be written as $$D_{\gamma,n} = \gamma_n - \gamma_{n-1} \quad (8)$$
$$= \Delta R_{r,n} - \Delta T_{r,n}$$
$$= [T_{4,n} - T_{4,n-1}] - [T_{3,n} - T_{3,n-1}]$$
$$= [T_{4,n} - T_{3,n}] - [T_{4,n-1} - T_{3,n-1}]$$
$$= d_{rtotal,n} - d_{rtotal,n-1}$$

These displacement factors can be computed using the timestamps captured during the delay-request message exchange process.

The frequency offset (or skew) has to be taken into account when computing the displacement factors and queue-induced time offset. For a system with clock model described by (1) and with known skew $\alpha_n$ at time n, the skew-corrected displacement factors can be computed as follows $$D_{skew,\epsilon,n} = (1+\alpha_n)\Delta R_{f,n} - \Delta T_{f,n} = (1+\alpha_n)[T_{2,n} - T_{2,n-1}] - [T_{1,n} - T_{1,n-1}] \quad (9)$$

$$D_{skew,\gamma,n} = \Delta R_{r,n} - (1+\alpha_n)\Delta T_{r,n} = [T_{4,n} - T_{4,n-1}] - (1+\alpha_n)[T_{3,n} - T_{3,n-1}] \quad (10)$$

$D_{skew,\epsilon,n}$ and $D_{skew,\gamma,n}$ are simply skew corrected versions of the differences in total forward and reverse delays, respectively. In the system with no skew ($\alpha_n = 0$) then $D_{skew,\epsilon,n} = D_{\epsilon,n}$ and $D_{skew,\gamma,n} = D_{\gamma,n}$.

The cumulative summation of the displacements are obtained as follows $$D_{fsum,n} = D_{fsum,n-1} + D_{\epsilon,n} = D_{fsum,n-1} + (d_{ftotal,n} - d_{ftotal,n-1}) = d_{ftotal,n} \quad (11)$$

$$D_{rsum,n} = D_{rsum,n-1} + D_{\gamma,n} = D_{rsum,n-1} + (d_{rtotal,n} - d_{rtotal,n-1}) = d_{rtotal,n} \quad (12)$$

It is assumed that $D_{fsum,0} = D_{nsum,0} = 0$ and $d_{ftotal,0} = d_{rtotal,0} = 0$. The summation of $D_{\epsilon,n}$ (or $D_{\gamma,n}$) gives the total forward (or reverse) delay at time n. Knowing the minimum forward delay $d_{f\,min}$ and minimum reverse delay $d_{r\,min}$ on the path, the queuing delays defined above, $q_{f,n}$ and $q_{r,n}$, for the forward and reverse directions on a path, respectively, can be obtained as follows $$q_{f,n} = D_{fsum,n} - d_{f\,min} = d_{ftotal,n} - d_{f\,min} \quad (13)$$

$$q_{r,n} = D_{rsum,n} - d_{r\,min} = d_{rtotal,n} - d_{r\,min} \quad (14)$$

The simplest way of estimating $d_{f\,min}$ and $d_{r\,min}$ is to keep a window of N samples of $D_{fsum,n}$ and $D_{rsum,n}$, respectively, and selecting the sample with the minimum value. With and $q_{r,n}$ known at time n, the offset due to queue-induced asymmetry $\theta_{queue}=(q_{f,n}-g_{r,n})/2$ can be computed. This offset can then be used in (4) to obtain a more accurate estimate of the clock offset between master and slave.

Application in Clock Synchronization

Next an embodiment of the present invention will be described which uses a clock offset and skew estimation technique and shows how compensation for queue-induced asymmetry can be applied in clock synchronization.

The offset and skew estimation method of this embodiment uses a Kalman Filter based technique. The Kalman filter allows measurements of a process observed over time, containing noise and other inaccuracies, to be used and produces values (estimates) that tend to be closer to the true values of the measurements and their associated calculated values. The Kalman filter produces estimates of the true values of measurements and their associated calculated values by predicting a value, estimating the uncertainty of the predicted value, and computing a weighted average of the predicted value and the measured value.

In order to use the Kalman filter (to estimate the internal state of a process given only a sequence of noisy observations), the process must be modelled in accordance with the framework of the Kalman filter. Accordingly a state-space model described by the following pair of equations is set up:

State Equation: $X_n = A_n X_{n-1} + w_n$, (15)

Measurement Equation: $y_n = D_n X_n + v_n$, (16)

where n is a nonnegative time index, $A_n$ is a known M-by-M state transition matrix, $X_n$ is the M-dimensional state (or parameter) vector, $w_n$ is an M-dimensional process noise vector which is assumed to be drawn from a zero mean multivariate normal distribution with covariance $Q_n = E[w_n w_n^T]$, $w_n \sim N(0, Q_n)$, $y_n$ is the measurement, $D_n$ is a known 1×M-dimensional measurement matrix which maps the true state space into the measurement space, $v_n$ is the measurement noise which is assumed to be zero mean Gaussian white noise with covariance $R_n = E[v_n v_n^T]$, $v_n \sim N(0, R_n)$, and T denotes transpose. It is assumed in the model that the initial state, and the noise vectors at each step $\{X_0, w_1, \ldots, w_n, v_1, \ldots, v_n\}$ are mutually independent.

The notation $\hat{X}'_{n,m}$ used below represents the estimate of X at time n given observations up to, and including at time m. The Kalman filter equations are most often conceptualized as two distinct phases: Predict and Update as described below.

Predict Phase:

The predict phase uses the state estimate from the previous time step to produce an estimate of the state at the current time step.

Predicted (a priori) state estimate:

$X_{n,n-1} = A_n \hat{X}_{n-1,n-1}$ (17)

This predicted state estimate is also known as the a priori state estimate because, although it is an estimate of the state at the current time step, it does not include observation information from the current time step.

Predicted (a priori) estimate covariance:

$P = A_n P_{n-1,n-1} A_n^T + Q_n$ (18)

Update Phase:

In the update phase, the current a priori prediction is combined with current observation information to refine the state estimate. This improved estimate is termed the a posteriori state estimate.

Innovation or measurement residual:

$\tilde{z}_n = y_n - D_n \hat{X}_{n,n-1}$ (19)

Innovation (or residual) covariance:

$S_n = D_n P_{n,n-1} D_n^T + R_n$ (20)

Optimal Kalman gain:

$K_n = P_{n,n-1} D_n^T S_n^{-1} = P_{n,n-1} D_n^T [D_n P_{n,n-1} D_n^T + R_n]^{-1}$ (21)

Updated (a posteriori) state estimate:

$\hat{X}_{n,n} = \hat{X}_{n,n-1} + K_n \tilde{z}_n = \hat{X}_{n,n-1} + K_n (y_n - D_n \hat{X}_{n,n-1})$ (22)

This is the a posteriori state estimate at time n given observations up to and including at time n. The second term in the above equation is called the correction term and it represents the amount by which to correct the propagated state estimate due to our measurement. Inspection of the Kalman gain equation shows that if the measurement noise is large, $R_n$ will be large, so that $K_n$ will be small and we would not give much credibility to the measurement y when computing the next $\hat{X}$. On the other hand, if the measurement noise is small, $R_n$ will be small, so that $K_n$ will be large and we will give a lot of credibility to the measurement when computing the next $\hat{X}$.

Updated (a posteriori) estimate covariance:

$P_{n,n} = (I - K_n D_n) P_{n,n-1}$ (23)

This is the a posteriori error covariance matrix (a measure of the estimated accuracy of the state estimate).

Typically, the two phases alternate, with the prediction advancing the state until the next scheduled observation, and the update incorporating the observation. Practical implementation of the Kalman Filter requires getting a good estimate of the noise covariance matrices $Q_n$ and $R_n$.

Measurement Equation

It is assumed that a Sync message travelling from a master to a slave experiences a fixed delay d plus a variable (stochastic) delays $\epsilon$. Similarly, it is assumed that a Delay_Req message sent from the slave to the master experiences a fixed delay of d and a variable delay $\gamma$. It is also assumed that the fixed delay components in both directions are equal (symmetric communication paths) but the messages experience variable delays such as queuing delays. The variables $\theta_n$ and $\alpha_n$ are the offset and skew during the nth Sync message exchange.

Based on the above definitions and adding equations (2) and (3) above, the measurement equation is obtained as $T_{1,n} + T_{4,n} + \epsilon_n - \gamma_n = (1 + \alpha_n)(T_{2,n} + T_{3,n}) + 2\theta_n$ $(T_{1,n} - T_{2,n}) + (T_{4,n} - T_{3,n}) = 2\theta_n + \alpha_n (T_{2,n} + T_{3,n}) + (\gamma_n - \epsilon_n)$ (24)

This measurement equation can be rewritten as $$\underbrace{(T_{1,n} - T_{2,n}) + (T_{4,n} - T_{3,n})}_{y_n} = \underbrace{2\theta_n + \alpha_n(T_{2n} + T_{3,n})}_{D_n X_n} + \underbrace{(\gamma_n - \varepsilon_n)}_{v_n} \quad (25)$$

where n is a nonnegative time index, $y_n = (T_{1,n} - T_{2,n}) + (T_{4,n} - T_{3,n})$ is a scalar, $D_n = [2 (T_{2,n} + T_{3,n})]$ is a vector, $X_n^T = [\theta_n \alpha_n]$ is a vector, and $v_n = (\gamma_n - \epsilon_n)$ is the measurement noise. The nth sampling interval is taken to be the period in which the nth Sync and nth Delay_Req messages exchanges occur.

State (Process) Equation

Below the clock (process) model parameters A and $w_n$ are derived. Two alternative ways of deriving the A matrix are provided.

Model A

In this model, the process dynamics for the clock are expressed as $\theta_n = \theta_{n-1} + w_{\theta,n}$ $$\alpha_n = \alpha_{n-1} + w_{\alpha,n} \qquad (26)$$

The A matrix in model A is simply the identity matrix, $$A = \begin{bmatrix} 1 & 0 \\ 0 & 1 \end{bmatrix} \qquad (27)$$

This model assumes that the offset and skew are fairly constant and that the whole system behavior is dominated by the measurement process which is fair assumption given that the noise margins of the oscillator are several orders of magnitude much smaller than the measurement noise. Note that $v_n = (\gamma_n - \epsilon_n)$ is many orders much bigger than $w_{\theta,n}$ and $w_{\alpha,n}$.

Model B

The A matrix in model B can be obtained as follows. The clock skew between two points $T_{1,n}$ and $T_{1,n-1}$ can be estimated given two clock offsets $\theta_n$ and $\theta_{n-1}$ as $$\alpha_{n-1} = \frac{\theta_n - \theta_{n-1}}{T_{1,n} - T_{1,n-1}}. \qquad (28)$$

The process dynamics for the clock can then be expressed while accounting for process noise as $$\theta_n = \theta_{n-1} + \alpha_{n-1}(T_{1,n} - T_{1,n-1}) + w_{\theta,n}$$

$$\alpha_n = \alpha_{n-1} + w_{\alpha,n} \qquad (29)$$

where $w_n^T = [w_{\theta,n}\ w_{\alpha,n}]$ is the process noise vector which is assumed to be drawn from a zero mean normal distribution with covariance $Q_n = E[w_n w_n^T]$.

The system can be described by the following two-state dynamic model $$\begin{aligned} X_n &= \begin{bmatrix} \theta_n \\ \alpha_n \end{bmatrix} \\ &= \begin{bmatrix} 1 & (T_{1,n} - T_{1,n-1}) \\ 0 & 1 \end{bmatrix} \begin{bmatrix} \theta_{n-1} \\ \alpha_{n-1} \end{bmatrix} + \begin{bmatrix} w_{\theta,n} \\ w_{\alpha,n} \end{bmatrix} \\ &= A X_{n-1} + w_n, \end{aligned} \qquad (30)$$

where $A_n$ is the known 2-by-2 state transition matrix.

If the time between Sync messages is fixed, then, $\Delta T_n = (T_{1,n} - T_{1,n-1}) = \Delta t$ is a constant term, and the A matrix becomes $$A = \begin{bmatrix} 1 & (T_{1,n} - T_{1,n-1}) \\ 0 & 1 \end{bmatrix} = \begin{bmatrix} 1 & \Delta t \\ 0 & 1 \end{bmatrix}. \qquad (31)$$

Skew Computation and Relationship Between Model A and Model B

This section considers how the two models described above are related and explains how both models can be used in clock synchronization. Of particular interest is the relationship between the skew terms in the two models. The skew is needed in the computation of the displacement factors in equations (9) and (10) and also for the computation of the offset in equation (4).

To help relate the skew in both models, a system with zero delay is assumed. If the offset $\theta_A$ and skew $\alpha_A$ are constant according to model A, then using (2), the following relationships are obtained $$T_{1,n} = (1+\alpha_A) T_{2,n} + \theta_A \qquad (32)$$

$$T_{1,n-1} = (1+\alpha_A) T_{2,n-1} + \theta_A \qquad (33)$$

Subtracting (33) from (32), and rearranging, model A provides $$\alpha_A = \frac{\Delta T_{f,n}}{\Delta R_{f,n}} - 1 \qquad (34)$$

Using (2), the following expressions for model B are derived $$T_{1,n} = (1+\alpha_B) T_{2,n} + \theta_n \qquad (35)$$

$$T_{1,n-1} = (1+\alpha_B) T_{2,n-1} + \theta_{n-1} \qquad (36)$$

$$\theta_n = \theta_{n-1} + \alpha_B (T_{1,n} - T_{1,n-1}) \qquad (37)$$

Substituting (37) into (35), give $$T_{1,n} = (1+\alpha_B) T_{2,n} + \theta_{n-1} + \alpha_B (T_{1,n} - T_{1,n-1}) \qquad (38)$$

Subtracting (36) from (38) and rearranging, provides $$\Delta T_{f,n} = (1 + \alpha_B) \Delta R_{f,n} + \alpha_B \Delta T_{f,n} \qquad (39)$$

$$\frac{\Delta T_{f,n}}{\Delta R_{f,n}} - 1 = \alpha_B + \alpha_B \frac{\Delta T_{f,n}}{\Delta R_{f,n}}$$

$$\frac{\Delta T_{f,n}}{\Delta R_{f,n}} - 1 = \alpha_B \left( 1 + \frac{\Delta T_{f,n}}{\Delta R_{f,n}} \right)$$

Now substituting for $\alpha_A$ in (34) into (39) provides an expression that relates the skew in the two models $$\alpha_A = \alpha_B \left( 1 + \frac{\Delta T_{f,n}}{\Delta R_{f,n}} \right) \qquad (40)$$

In the case where there is negligible or no PDV, it assumed $\Delta T_{f,n} \approx \Delta R_{f,n}$, which the gives us $$\alpha_A = 2\alpha_B \qquad (41)$$

This relationship has been verified extensively via simulations even with PDV present in the system and has been shown to hold true.

When model A is used, then $\alpha_A$ can be used directly in (9), (10) and (4) but when model B is used, twice of $\alpha_B$ must be used.

Note that the estimated offset and skew from both models when used to derive the master (server) time according to equation (1) produce the same results.

The systems and methods of the above embodiments may be implemented in a computer system (in particular in computer hardware or in computer software) in addition to the structural components and user interactions described.

The term "computer system" includes the hardware, software and data storage devices for embodying a system or carrying out a method according to the above described embodiments. For example, a computer system may comprise a central processing unit (CPU), input means, output means and data storage. Preferably the computer system has a monitor to provide a visual output display (for example in the design of the business process). The data storage may comprise RAM, disk drives or other computer readable media. The computer system may include a plurality of computing devices connected by a network and able to communicate with each other over that network.

The methods of the above embodiments may be provided as computer programs or as computer program products or computer readable media carrying a computer program which is arranged, when run on a computer, to perform the method(s) described above.

The term "computer readable media" includes, without limitation, any non-transitory medium or media which can be read and accessed directly by a computer or computer system. The media can include, but are not limited to, magnetic storage media such as floppy discs, hard disc storage media and magnetic tape; optical storage media such as optical discs or CD-ROMs; electrical storage media such as memory, including RAM, ROM and flash memory; and hybrids and combinations of the above such as magnetic/optical storage media.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

In particular, although the methods of the above embodiments have been described as being implemented on the systems of the embodiments described, the methods and systems of the present invention need not be implemented in conjunction with each other, but can be implemented on alternative systems or using alternative methods respectively.

REFERENCES

[1]. M. Ouellette, Kuiwen Ji, Song Liu, and Han Li, "Using IEEE 1588 and boundary clocks for clock synchronization in telecom networks," *IEEE Commun. Mag.*, February 2011, pp. 164-171.
[2]. M. Ouellette, G. Garner, and S. Jobert "S. Simulations of a chain of Telecom Boundary Clocks combined with Synchronous Ethernet for phase/time transfer" 2011 *International IEEE Symposium on Precision Clock Synchronization for Measurement Control and Communication (ISPCS)*, 12-16 Sep. 2011, pp. 105-113
[3]. ITU-T Recommendation G.8271/Y.1366, Time and phase synchronization aspects of packet networks, February 2012.

All references referred to above are hereby incorporated by reference.

The invention claimed is:

1. A method of estimating asymmetric delays in communications between a master device and a slave device connected by a network, the method including the steps of:
   sending to the slave device first and second timing messages from the master device and respective first and second timestamps being the time of sending of the first and second messages according to the master clock;
   recording as third and fourth timestamps the time of receipt of the first and second messages at the slave device according to the slave clock;
   sending third and fourth timing messages to the master device from the slave device and recording as fifth and sixth timestamps the time of sending of the third and fourth messages according to the slave clock;
   recording as seventh and eighth timestamps the time of receipt of the third and fourth messages at the master device according to the master clock;
   sending, from the master device to the slave device, the seventh and eighth timestamps;
   calculating from said first to fourth timestamps a forward displacement factor which is a difference between the interval between the sending of said first and second timing messages and the interval between the receipt of said first and second timing messages;
   maintaining a total sum of said forward displacement factors since a predetermined point in time;
   estimating a total forward delay experienced by the timing messages sent from the master device to the slave device as equal to said total sum;
   estimating a minimum forward delay experienced by timing messages sent from the master device to the slave device;
   estimating a forward queuing delay as the difference between the estimated total forward delay and the estimated minimum forward delay;
   calculating from said fifth to eighth timestamps a reverse displacement factor which is a difference between the interval between the sending of said third and fourth timing messages and the interval between the receipt of said third and fourth timing messages;
   maintaining a total sum of said reverse displacement factors since a predetermined point in time;
   estimating a total reverse delay experienced by the timing messages sent from the master device to the slave device as equal to said total sum;
   estimating a minimum reverse delay experienced by timing messages sent from the slave device to the master device;
   estimating a reverse queuing delay as the difference between the estimated total forward delay and the estimated minimum reverse delay.

2. The method according to claim 1, wherein the steps of calculating the forward and reverse displacement factors takes account of an estimated skew of the slave clock compared to the master clock.

3. The method according to claim 1, wherein the steps of estimating the minimum forward delay and estimating the minimum reverse delay, involve determining the smallest delay experienced by a timing message in the respective forward or reverse direction since the start of the exchange of timing messages.

4. The method according to claim 1, wherein the steps of estimating the minimum forward delay and estimating the minimum reverse delay involve determining the smallest delay experienced by a timing message in the respective forward or reverse direction within a predetermined period prior to the exchange of timing messages.

5. The method according to claim 1, further including the steps of estimating a skew and offset of the slave clock compared to the master clock using the calculated delays.

6. The method according to claim 5, further including a step of synchronizing the slave clock to the master clock using said estimated skew and offset.

7. A slave device connected to a master device having a master clock over a network, wherein the slave device includes:
   a slave clock; and
   a processor, wherein:
   the slave device is arranged to:
      receive first and second timing messages sent from the master device and respective first and second timestamps being the time of sending of the first and second messages according to the master clock, and to record the time of receipt of the first and second messages according to the slave clock as third and fourth timestamps;

send third and fourth timing messages to the master device for the master device to record the time of receipt of the third and fourth messages according to the master clock;

record the time of sending of the third and fourth messages according to the slave clock as fifth and sixth timestamps; and receive, from the master device, the recorded time of receipt of the third and fourth messages as seventh and eighth timestamps;

the processor is arranged to:

calculate from said first to fourth timestamps a forward displacement factor which is a difference between the interval between the sending of said first and second timing messages and the interval between the receipt of said first and second timing messages;

maintain a total sum of said forward displacement factors since a predetermined point in time;

estimate a total forward delay experienced by the timing messages sent from the master device to the slave device as equal to said total sum;

estimate a minimum forward delay experienced by timing messages sent from the master device to the slave device;

estimate a forward queuing delay as the difference between the estimated total forward delay and the estimated minimum forward delay;

calculate from said fifth to eighth timestamps a reverse displacement factor which is a difference between the interval between the sending of said third and fourth timing messages and the interval between the receipt of said third and fourth timing messages;

maintain a total sum of said reverse displacement factors since a predetermined point in time;

estimate a total reverse delay experienced by the timing messages sent from the master device to the slave device as equal to said total sum;

estimate a minimum reverse delay experienced by timing messages sent from the salve device to the master device;

estimate a reverse queuing delay as the difference between the estimated total forward delay and the estimated minimum reverse delay.

8. The slave device according to claim 7, wherein the processor is arranged to take account of an estimated skew of the slave clock compared to the master clock when calculating the forward and reverse displacement factors.

9. The slave device according to claim 7, wherein when estimating the minimum forward delay and estimating the minimum reverse delay, the processor is further arranged to determine the smallest delay experienced by a timing message in the respective forward or reverse direction since the start of the exchange of timing messages.

10. The slave device according to claim 7, wherein when estimating the minimum forward delay and estimating the minimum reverse delay, the processor is further arranged to determine the smallest delay experienced by a timing message in the respective forward or reverse direction within a predetermined period prior to the exchange of timing messages.

11. The slave device according to claim 7, wherein the processor is further arranged to estimate a skew and offset of the slave clock compared to the master clock using the calculated delays.

12. The slave device according claim 11, further arranged to synchronize the slave clock to the master clock using said estimated skew and offset.

13. A system for estimating asymmetric delays in communications between a master device and a slave device connected by a network, the system including:

the master device having a master clock;

the slave device having a slave clock and a processor; and a network connecting the master device and the slave device, wherein:

the master device is arranged to send first and second timing messages to the slave device and respective first and second timestamps being the time of sending of the first and second messages according to the master clock, the slave device is arranged to record the time of receipt of the first and second messages according to the slave clock as third and fourth timestamps;

the slave device is arranged to send third and fourth timing messages to the master device and to record the time of sending of the third and fourth messages according to the slave clock as fifth and sixth timestamps; and the master device is arranged to record the time of receipt of the third and fourth messages according to the master clock as seventh and eighth timestamps and to send those timestamps to the slave device;

and further wherein:

the processor in the slave device is arranged to:

calculate from said first to fourth timestamps a forward displacement factor which is a difference between the interval between the sending of said first and second timing messages and the interval between the receipt of said first and second timing messages;

maintain a total sum of said forward displacement factors since a predetermined point in time;

estimate a total forward delay experienced by the timing messages sent from the master device to the slave device as equal to said total sum;

estimate a minimum forward delay experienced by timing messages sent from the master device to the slave device;

estimate a forward queuing delay as the difference between the estimated total forward delay and the estimated minimum forward delay;

calculate from said fifth to eighth timestamps a reverse displacement factor which is a difference between the interval between the sending of said third and fourth timing messages and the interval between the receipt of said third and fourth timing messages;

maintain a total sum of said reverse displacement factors since a predetermined point in time;

estimate a total reverse delay experienced by the timing messages sent from the master device to the slave device as equal to said total sum;

estimate a minimum reverse delay experienced by timing messages sent from the salve device to the master device;

estimate a reverse queuing delay as the difference between the estimated total forward delay and the estimated minimum reverse delay.

14. The system according to claim 13, wherein the processor is arranged to take account of an estimated skew of the slave clock compared to the master clock when calculating the forward and reverse displacement factors.

15. The system according to claim 13, wherein when estimating the minimum forward delay and estimating the minimum reverse delay, the processor is further arranged to determine the smallest delay experienced by a timing message in the respective forward or reverse direction since the start of the exchange of timing messages.

16. The system according to claim 13, wherein when estimating the minimum forward delay and estimating the minimum reverse delay, the processor is further arranged to determine the smallest delay experienced by a timing message in the respective forward or reverse direction within a predetermined period prior to the exchange of timing messages.

17. The system according to claim 13, wherein the processor is further arranged to estimate a skew and offset of the slave clock compared to the master clock using the calculated delays.

18. The system according claim 17, wherein the slave device is further arranged to synchronize the slave clock to the master clock using said estimated skew and offset.

* * * * *